US009874225B2

(12) United States Patent
Langhans et al.

(10) Patent No.: US 9,874,225 B2
(45) Date of Patent: Jan. 23, 2018

(54) VACUUM DEVICE FOR COLLECTING LIGHT AND HEAVY MATERIAL

(71) Applicant: Andreas Stihl AG & Co. KG, Waiblingen (DE)

(72) Inventors: Klaus Langhans, Winnenden (DE); Tilman Seidel, Stuttgart (DE); Christoph Hegenbart, Kraichtal (DE); Mario Kuschewski, Weil der Stadt (DE); Oliver Schlötzer, Roth (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 47 days.

(21) Appl. No.: 15/092,626

(22) Filed: Apr. 7, 2016

(65) Prior Publication Data

US 2016/0296088 A1 Oct. 13, 2016

(30) Foreign Application Priority Data

Apr. 13, 2015 (DE) .................. 10 2015 004 664

(51) Int. Cl.

| | |
|---|---|
| *A47L 5/14* | (2006.01) |
| *F04D 29/44* | (2006.01) |
| *F04D 17/16* | (2006.01) |
| *F04D 19/00* | (2006.01) |
| *F04D 25/08* | (2006.01) |
| *F04D 29/70* | (2006.01) |
| *A01G 1/12* | (2006.01) |

(52) U.S. Cl.
CPC ........... *F04D 29/441* (2013.01); *F04D 17/16* (2013.01); *F04D 19/002* (2013.01); *F04D 25/08* (2013.01); *F04D 29/701* (2013.01); *A01G 1/125* (2013.01); *A47L 5/14* (2013.01)

(58) Field of Classification Search
CPC ... A47L 5/24; A47L 9/104; A47L 5/14; E01H 1/08; A01G 1/12
USPC .......................................................... 15/344
See application file for complete search history.

(56) References Cited

U.S. PATENT DOCUMENTS

| | | | |
|---|---|---|---|
| 2002/0108207 A1* | 8/2002 | Oohama | A47L 5/14 15/330 |
| 2007/0101535 A1* | 5/2007 | Maier | A01G 1/125 15/346 |

FOREIGN PATENT DOCUMENTS

| | | |
|---|---|---|
| DE | 196 08 376 A1 | 9/1997 |
| EP | 0813838 | * 12/1997 |

* cited by examiner

*Primary Examiner* — David Redding
(74) *Attorney, Agent, or Firm* — Gudrun E. Huckett

(57) ABSTRACT

A vacuum device has a motor-driven blower wheel with suction side and with pressure side with pressure channel and blow-out opening. An intake pipe at the suction side has an intake opening and a discharge opening at opposed ends. The intake pipe conveys a suction airflow entraining first and second collected materials. Through the discharge opening the first collected material is discharged from the intake pipe. A blower inlet opening is formed in a wall of the intake pipe. Blower inlet opening, blower wheel, and pressure channel are configured such that second collected material passes through blower inlet opening and blower wheel into the pressure channel for discharge through blow-out opening. The blower inlet opening, in longitudinal direction of the intake pipe, is positioned between discharge opening and intake opening at a first spacing to the intake opening and at a second spacing to the discharge opening.

15 Claims, 11 Drawing Sheets

VACUUM DEVICE FOR COLLECTING LIGHT AND HEAVY MATERIAL

BACKGROUND OF THE INVENTION

The invention relates to a vacuum device comprising a blower wheel that is driven by a motor. The blower wheel comprises a suction side and a blower inlet opening supplies air to the blower wheel. The vacuum device comprises an intake pipe that is arranged at the suction side of the blower wheel and comprises an intake opening provided at the first end and an outlet opening provided at the second end. The vacuum device further comprises a pressure channel provided at the pressure side of the blower wheel and comprising a blow-out opening. The intake pipe conveys a suction air flow entraining first and second materials to be collected and comprises a discharge opening for the first collected material picked up by the suction air flow. The second collected material is discharged via the blower inlet opening and the blower wheel and by the discharge air flow within the pressure channel through the blow-out opening.

DE 196 08 376 discloses a vacuum device with an electric drive motor; light material as well as heavy material is picked up by means of a suction air flow. The intake pipe guides the suction air flow to the blower wherein an opening is provided in the wall of the intake pipe, upstream of the blower wheel, in order to separate the heavy collected material from the light collected material. The light collected material moves through the blower wheel, is chopped thereby, and is discharged as chopped material into an air-permeable collecting bag.

In order to ensure separation of the heavy collected material in a collecting space, this collecting space must be air impermeable.

SUMMARY OF THE INVENTION

It is an object of the present invention to provide a vacuum device of the aforementioned kind that is configured such that a common collection of light and heavy collected material in one collecting space is possible.

In accordance with the present invention, this is achieved in that the outlet opening at the end of the intake pipe forms the discharge opening, in that the blower inlet opening is formed in the wall of the intake pipe, and in that the blower inlet opening, viewed in the longitudinal direction of the intake pipe, is positioned between the discharge opening and the intake opening in such a way that the blower inlet opening, viewed in the longitudinal direction of the intake pipe, is positioned at a first spacing relative to the intake opening and at a second spacing relative to the discharge opening.

Firstly, it is provided that the outlet opening at the end of the intake pipe forms the discharge opening for the heavy collected material. The blower wheel is positioned in or adjacent to a blower inlet opening which is formed in the wall of the intake pipe. In this context, it is provided that the blower inlet opening in the longitudinal direction of the intake pipe is positioned between the discharge opening and the intake opening. In this context, the blower inlet opening, viewed in the longitudinal direction of the intake pipe, is positioned at a first spacing relative to the intake opening and at a second spacing relative to the discharge opening.

By means of the configuration in accordance with the invention, it is possible to collect the collected material either in a common collecting space or in separate collecting spaces, depending on the situation in which the vacuum device is used. For example, when hazelnuts or the like are collected, the leaves are chopped by means of the blower wheel and blown out into a catching bag while the fruits (crop) are collected via the discharge opening in a separate collecting container.

When cleaning work is performed, a common catching bag can be used; it is ensured that the heavy collected material does not pass through the blower wheel so that the blower wheel or the blower is protected.

In an advantageous configuration, the first spacing which is measured in the longitudinal direction of the intake pipe relative to the intake opening can be greater than the second spacing which is measured in the longitudinal direction of the intake pipe relative to the discharge opening. When a great length between the intake opening of the intake pipe and the blower inlet opening is provided, a long acceleration stretch for the heavy collected material is provided so that the heavy collected material is sufficiently accelerated to a fast enough speed in order to pass the blower inlet opening and not be sucked in.

The separation effect between the light collected material and the heavy collected material is enhanced when the blower inlet opening is formed in a straight linear pipe section of the intake pipe.

In a first embodiment, the blower wheel can be positioned about an axis of rotation transverse to a longitudinal center axis of the straight linear pipe section. For example, when a radial blower is used, the axis of rotation of the radial blower can be positioned at a right angle to the longitudinal center axis of the straight linear pipe section.

When an axial blower is used, the blower wheel can rotate about an axis of rotation that is advantageously positioned at an acute angle relative to the longitudinal center axis of the pipe section. In this context, the arrangement can also be selected such that the axis of rotation extends parallel to the longitudinal center axis of the straight linear pipe section.

The blower wheel is preferably arranged in the blower inlet opening in the wall of the intake pipe. This arrangement is advantageous in particular in case of a radial blower.

It can be expedient to arrange the blower wheel with axial spacing relative to the blower inlet opening. This configuration can be advantageous for axial blowers.

The discharge opening of the intake pipe and the blow-out opening of the pressure channel can open into a common collecting space without the functionality of the vacuum device being affected. The construction is designed such that the back pressure present within the pressure channel is decoupled from the suction pressure existing in the intake pipe.

In a simple configuration, the discharge opening has correlated therewith a locking flap in order to close off the discharge opening by this locking flap. In the closed position, the locking flap closes off the discharge opening substantially air-tightly, and preferably completely air-tightly.

The locking flap can be suspended so as to freely swing and can be actuated by a vacuum which is generated in operation in order to pivot from an open position into a closed position. The support (bearing) of the locking flap can be selected according to respective conditions. Preferably, the support (bearing) of the locking flap is located between the blow-out opening of the pressure channel and the outlet opening of the intake pipe that forms the discharge opening. At this location, a bypass flow from the blow-out opening to the discharge opening could occur so that air that is blown out of the blow-out opening could be sucked in through the discharge opening into the blower inlet opening. This bypass flow is prevented by closing the locking flap.

Advantageously, the locking flap is loaded by a spring force into its closed position.

In an advantageous further embodiment of the invention, the size of the flow cross-section of the intake opening of the intake pipe is designed to be greater than the size of the flow cross-section of the discharge opening of the intake pipe. Expediently, the blow-out opening of the pressure channel can be designed such that the intake air flow from the intake pipe into the collecting space is enhanced. A configuration of the blow-out opening as an injector nozzle is expedient.

In order to ensure separate conveying of the light collected material and of the heavy collected material, the intake pipe and the pressure channel are designed as flow channels that are constructively separated from each other.

BRIEF DESCRIPTION OF THE DRAWING

Further features of the invention result from the claims, the description, and the drawings in which different embodiments of the vacuum device according to the invention are illustrated.

DESCRIPTION OF THE PREFERRED EMBODIMENTS

Figure 1:
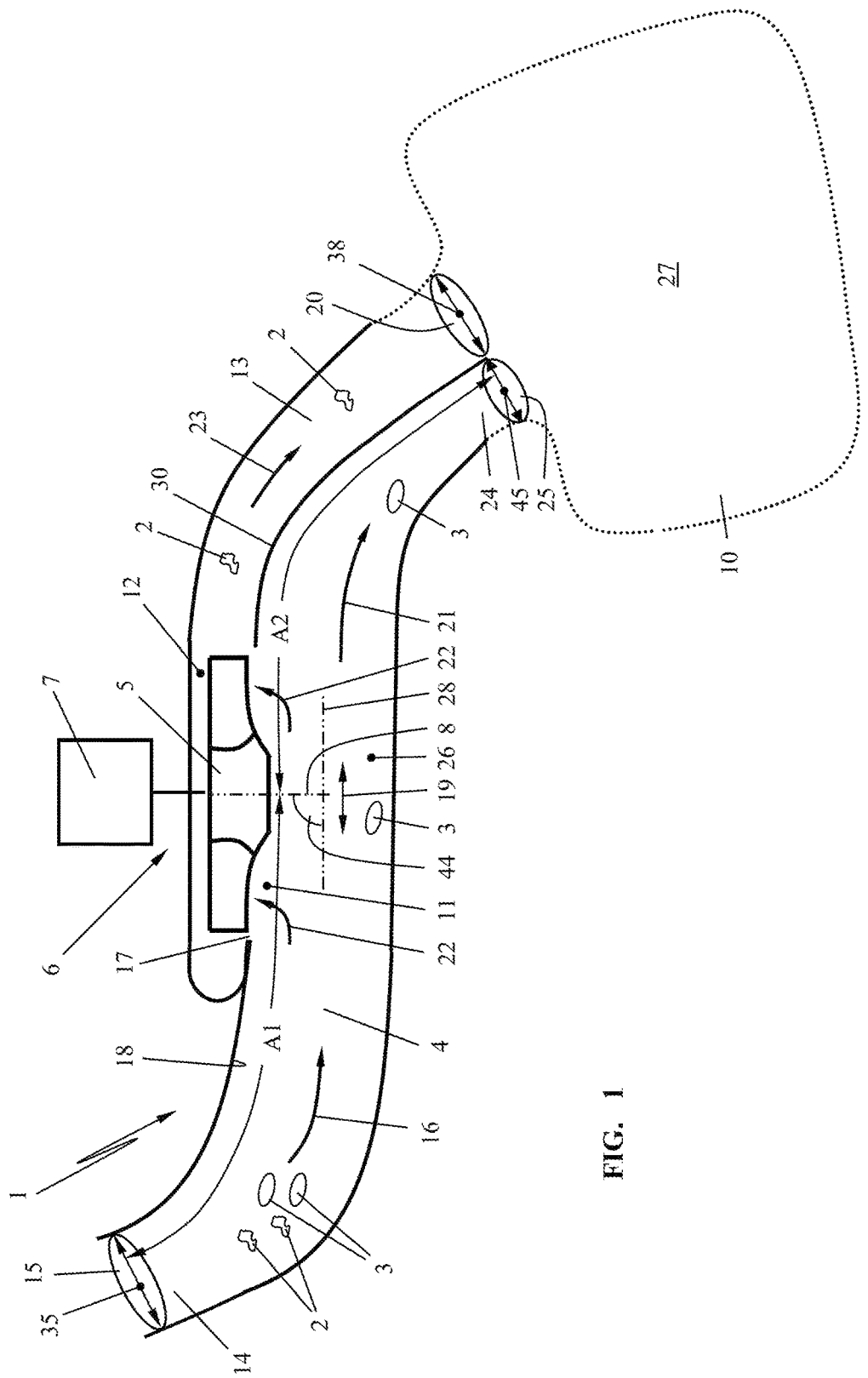
FIG. 1 shows a vacuum device according to the invention with a radial blower, a blow-out opening for the discharge air flow, and the discharge opening for hard collected material.

The vacuum devices illustrated in FIGS. 1 to 8 are schematic illustrations and disclose the principle of the important features according to the teachings of the invention.

The vacuum device 1 serves for collecting a first heavy collected material 3 and a light second collected material 2. The vacuum device 1 comprises an intake pipe 4 at the suction side 11 of a blower wheel 5. In the embodiment according to FIG. 1, the blower wheel 5 is part of a radial blower 6 which is rotatingly driven about an axis of rotation 8 by a drive 7. The drive 7 can be an internal combustion engine, an electric motor or the like.

The intake pipe 4 comprises an intake opening 15 at a first end 14. At the second end 24 an outlet opening 25 is provided. In the embodiment according to FIG. 1, the outlet opening 25 opens into a collecting space 27 which is provided in a collecting bag 10 that is in particular air-permeable.

The blower wheel 5 comprises at the pressure side (discharge side) 12 a pressure channel 13 with a blow-out opening 28 which comprises a flow cross-section 38. At the suction side 11 of the blower wheel 5, a suction air flow 16 enters the intake pipe 4 via the intake opening 15 and entrains light collected material 2 as well as heavy collected material 3.

The blower inlet opening 17 of the radial blower 6 is provided in the wall 18 of the intake pipe 4. The blower inlet opening 17 is positioned, viewed in the longitudinal direction 19 of the intake pipe 4, between the outlet opening 25 of the intake pipe 4 and the intake opening 15. As shown in the embodiment according to FIG. 1, the blower inlet opening 17 is positioned, viewed in the longitudinal direction 19 of the intake pipe 4, at a first spacing A1 relative to the intake opening 15 and at a second spacing A2 relative to the outlet opening 25 of the intake pipe 4. In the illustrated embodiment according to FIG. 1, the spacing A1 corresponds approximately to the spacing A2.

The mixed material entering the intake pipe 4 through the intake opening 15 and comprised of light collected material 2 and heavy collected material 3 is accelerated across the travel path of the spacing A1 to the blower inlet opening 17 so that the heavy collected material 3 moves past the blower inlet opening 17 in the longitudinal direction 19 of the intake pipe 4 and flies in the direction of arrow 21 to the outlet opening 25 of the intake pipe 4. The heavy collected material 3 passes through the outlet opening 25 into the collecting bag 10; the outlet opening 25 forms a discharge opening for the heavy collected material 3.

In contrast to the heavier collected material 3, the lighter collected material 2 can follow the air deflection from the intake pipe 4 via the blower inlet opening 17 into the pressure channel 13 in the direction of arrow 22 and is blown out by means of the discharge air flow 23 in the pressure channel 13 through the blow-out opening 20. The light collected material 2 passes via the flow cross-section 38 of the blow-out opening 20 into the collecting bag 10.

The spacings A1 and A2 are advantageously selected such that the first spacing A1 measured in the longitudinal direction 19 of the intake pipe 4 is greater than the second spacing A2 measured in the longitudinal direction 19 of the intake pipe 4 relative to the discharge opening.

As illustrated in FIG. 1, the blower inlet opening 17 is advantageously positioned in a straight linear pipe section 26 of the intake pipe 4. In this context, the arrangement of the radial blower 6 is such that the axis of rotation 8 is transverse to the longitudinal center axis 28 of the straight linear pipe section 26. Not only axes of rotation 8 positioned at an angle of 90° are transverse to the longitudinal center axis 28; positions of the axes of rotation 8 that differ from 90° are also transverse to the longitudinal center axis 28. Advantageously, all positions of the axis of rotation 8 are referred to as transverse to the longitudinal center axis 28 when the condition is fulfilled that an imaginary extension of the axis of rotation 8 intersects the longitudinal center axis 28.

FIG. 1 shows that the blower wheel 5 is positioned in the wall 18 of the intake pipe 4 in the blower inlet opening 17.

As shown in FIG. 1, the discharge opening and the blow-out opening 20 are opening into a common collecting space 27 that is formed by the collecting bag 10. The configuration is such that the back pressure which is present in the pressure channel 13 is decoupled from the suction pressure which is existing in the intake pipe 4. In this way, the performance of the radial blower 6 is enhanced; bypass flows are prevented.

For obtaining a satisfactory air flow, it is provided that the size of the flow cross-section 35 of the intake opening 15 is greater than the size of the flow cross-section 45 of the discharge opening or of the outlet opening 25 of the intake pipe 4. It is provided to configure the pressure channel 13 as a flow channel which is constructively separated from the intake pipe 4. In FIG. 1, one possible embodiment is illustrated where the pressure channel 13 and the intake pipe 4 have a common separating wall 30 which separates the intake pipe 4 from the pressure channel 13. The blower inlet opening 17 is formed in this separating wall 30.

Figure 2:
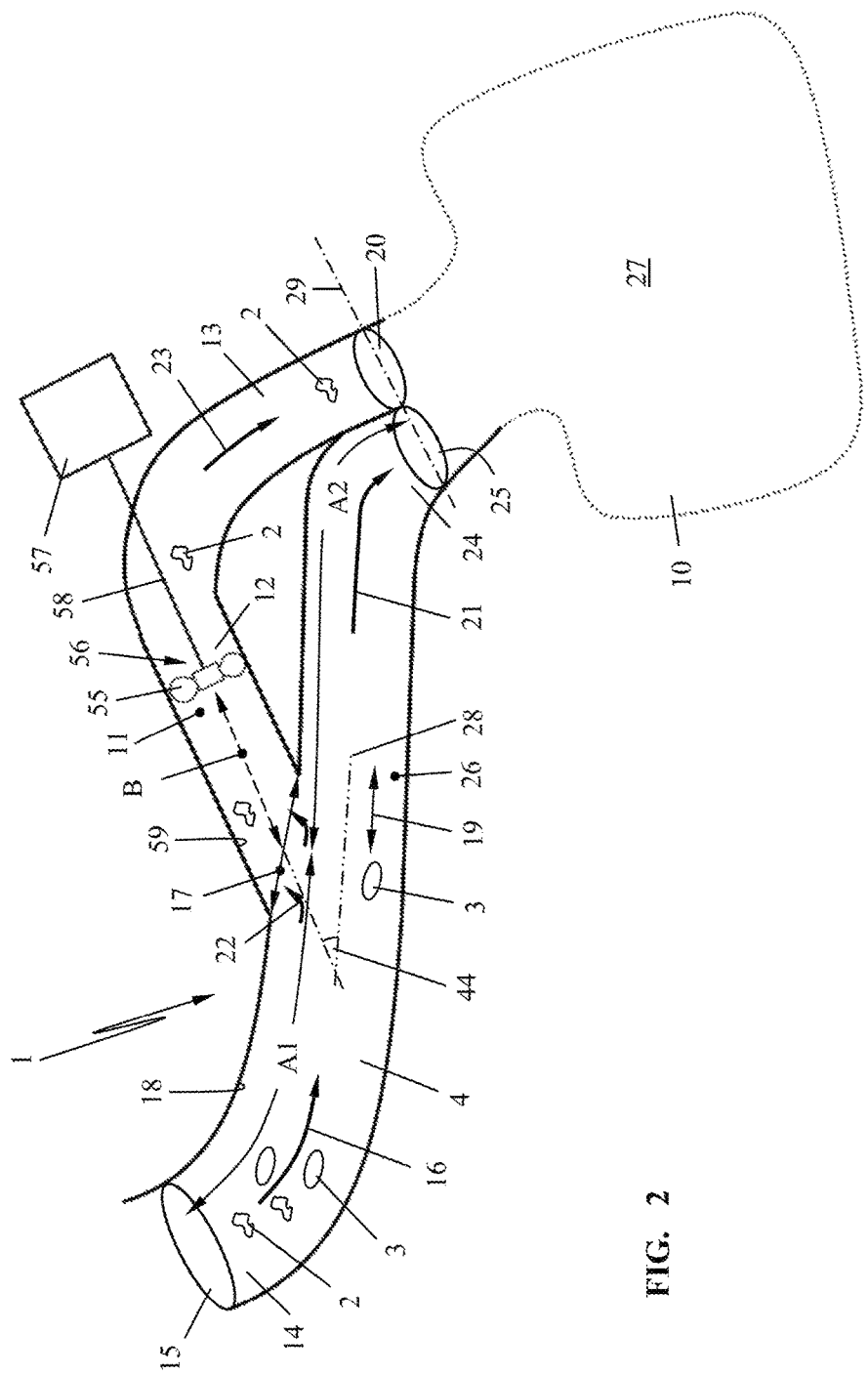
FIG. 2 shows an embodiment of a vacuum device in a configuration according to FIG. 1 with an axial blower.

The embodiment according to FIG. 2 corresponds in its basic configuration to that according to FIG. 1 so that for same parts same reference characters are used. In the embodiment according to FIG. 2, an axial blower 56 with a blower wheel 55 is provided in place of the radial blower 6. The axial blower 56 is driven by a drive 57 which can be embodied as an internal combustion engine, electric motor or the like. The drive 57 rotatingly drives the blower wheel 55 about an axis of rotation 58.

In the wall 18 of the intake pipe 4, preferably in a straight pipe section 26, a blower inlet opening 17 is formed which is positioned at the suction side 11 of the blower wheel 55. In the embodiment according to FIG. 2, between the blower inlet opening 17 and the blower wheel 55 an in particular straight linear channel section 59 is formed which guides an intake air flow sucked in through the intake opening 15 to the axial blower 56. The blower wheel 55 has an axial spacing B relative to the blower inlet opening 17.

At the pressure side (discharge side) 12 of the axial blower 56 the pressure channel 13 guides the discharge air flow 23 to the blow-out opening 20. As shown in FIG. 2, the blow-out opening 20 and the discharge opening of the intake pipe 4 are positioned expediently in a plane 29 adjacent to each other. The discharge opening and the blow-out opening 20 open into a common collecting space 27 which is formed in particular by an air-permeable collecting bag 10.

While in FIG. 1 the axis of rotation 8 is positioned at an angle 44 of 90° to the longitudinal center axis 28 of the straight pipe section 26, in the embodiment according to FIG. 2 the arrangement is such that the axis of rotation 58 is positioned at an angle 44 relative to the longitudinal center axis 28 of the straight pipe section 26 that is smaller than 90°. In the illustrated embodiment according to FIG. 2, the angle 44 is approximately 30° to 50°, in particular 45°.

Figure 3:
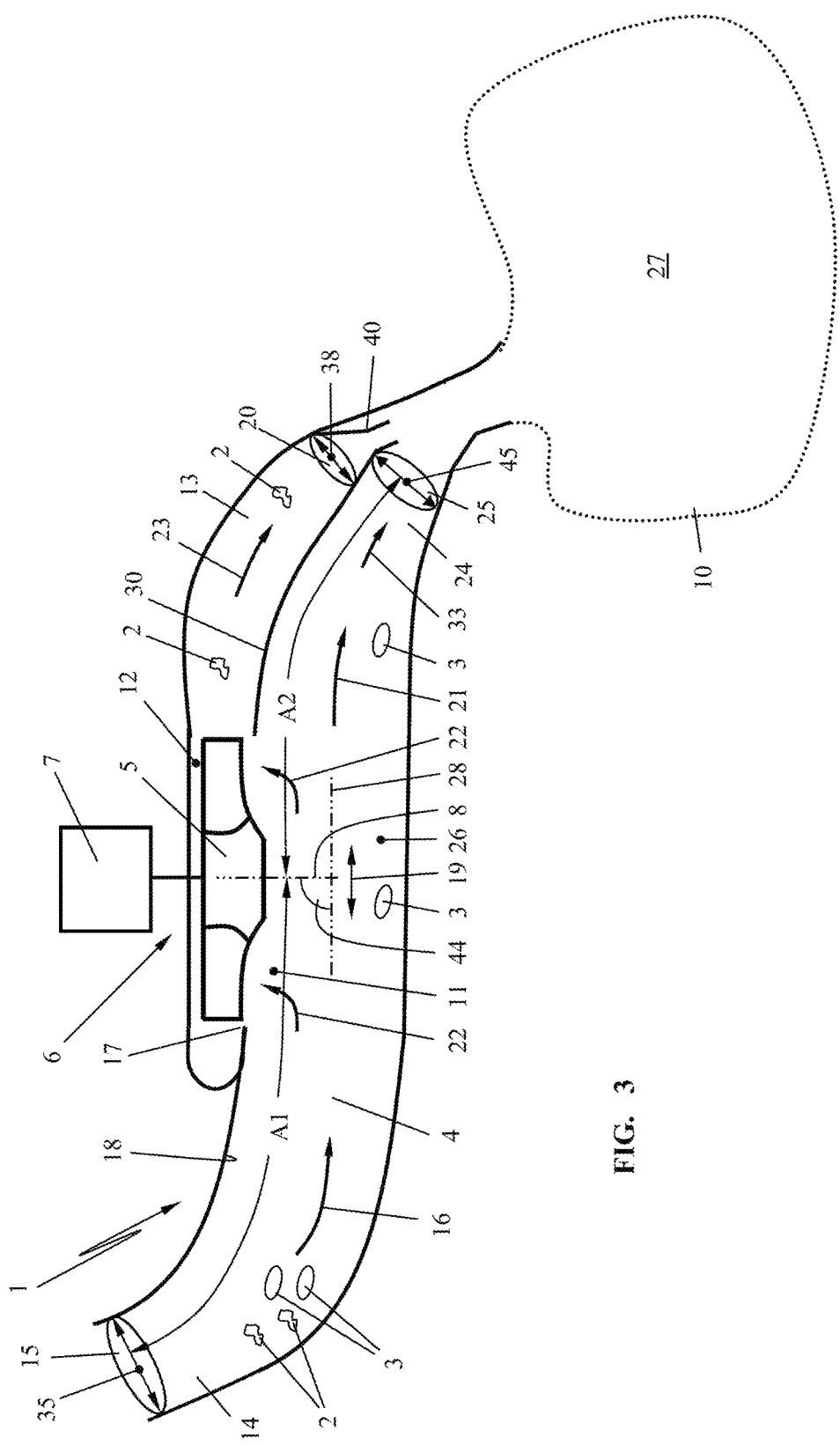
FIG. 3 shows a further embodiment of a vacuum device with a discharge opening for hard collected material and a blow-out opening embodied as an injector for the discharge air flow at the pressure side of the blower.

The embodiment according to FIG. 3 corresponds in its basic configuration to that of FIG. 1 so that for same parts same reference characters are used.

In the embodiment according to FIG. 3, the blow-out opening 20 of the pressure channel 13 is designed as an injector nozzle 40 so that the conveying air flow 33 to the discharge opening is enhanced. This enhances the suction air flow 16 from the intake opening 15 of the intake pipe 4 to its outlet opening 25 or its discharge opening.

Figure 4:
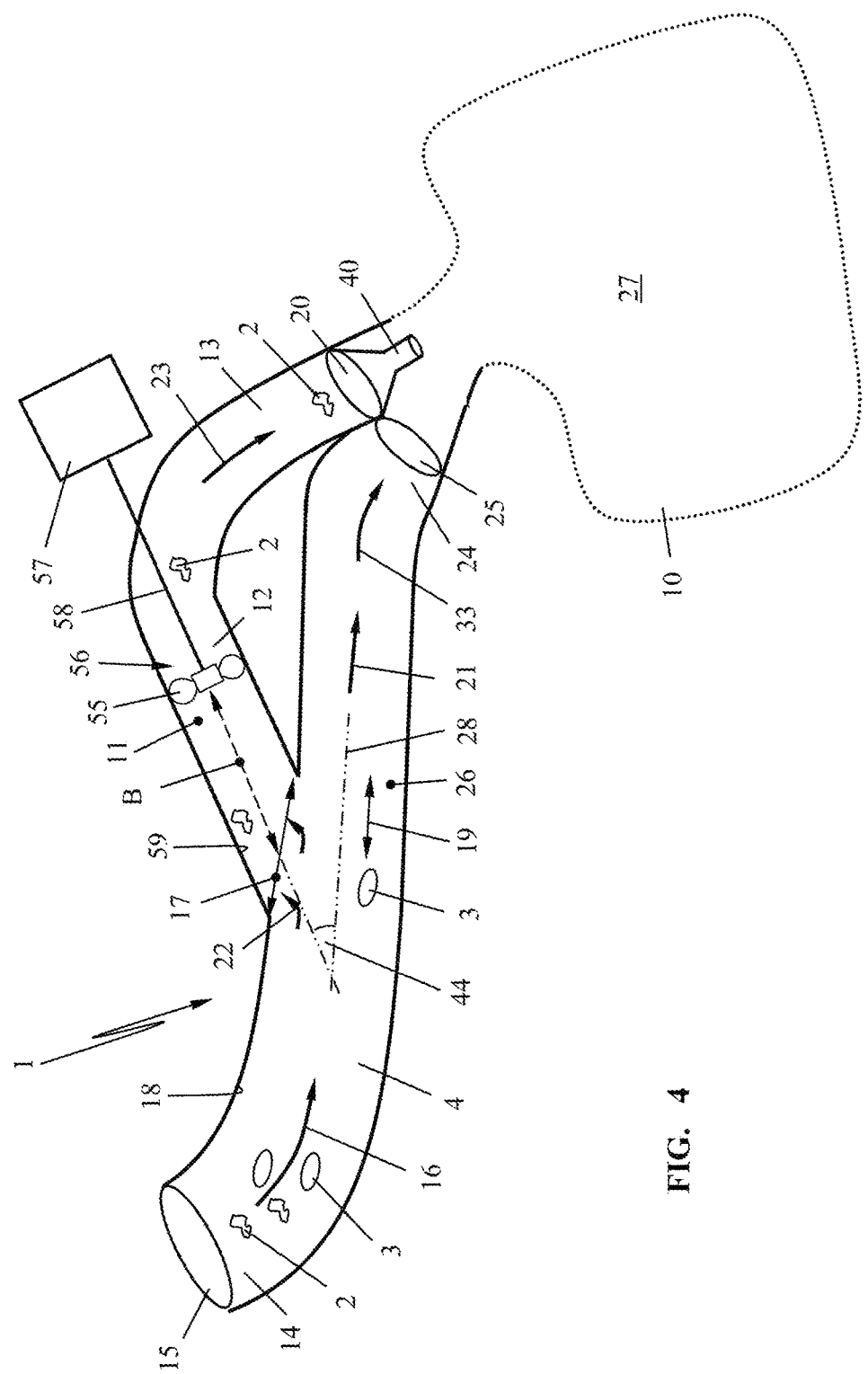
FIG. 4 shows a vacuum device in a configuration according to FIG. 3 with an axial blower.

The embodiment according to FIG. 4 corresponds in its configuration to that of FIG. 3 so that for same parts same reference characters are employed. Instead of a radial blower 6, as illustrated in FIG. 3, an axial blower 56 is provided in FIG. 4. The channel course from the intake opening 15 at one end to the discharge opening and the blow-out opening 20 at the other end corresponds to that of FIG. 2. The discharge opening and the blow-out opening 20 open into a common collecting space 27 which is formed by a bag 10 that is preferably air-permeable.

An injector 40 in the form of a nozzle is arranged at the blow-out opening 20 so that the suction air flow 16 from the intake opening 15 to the outlet opening 25 or the discharge opening is enhanced.

Figure 5:
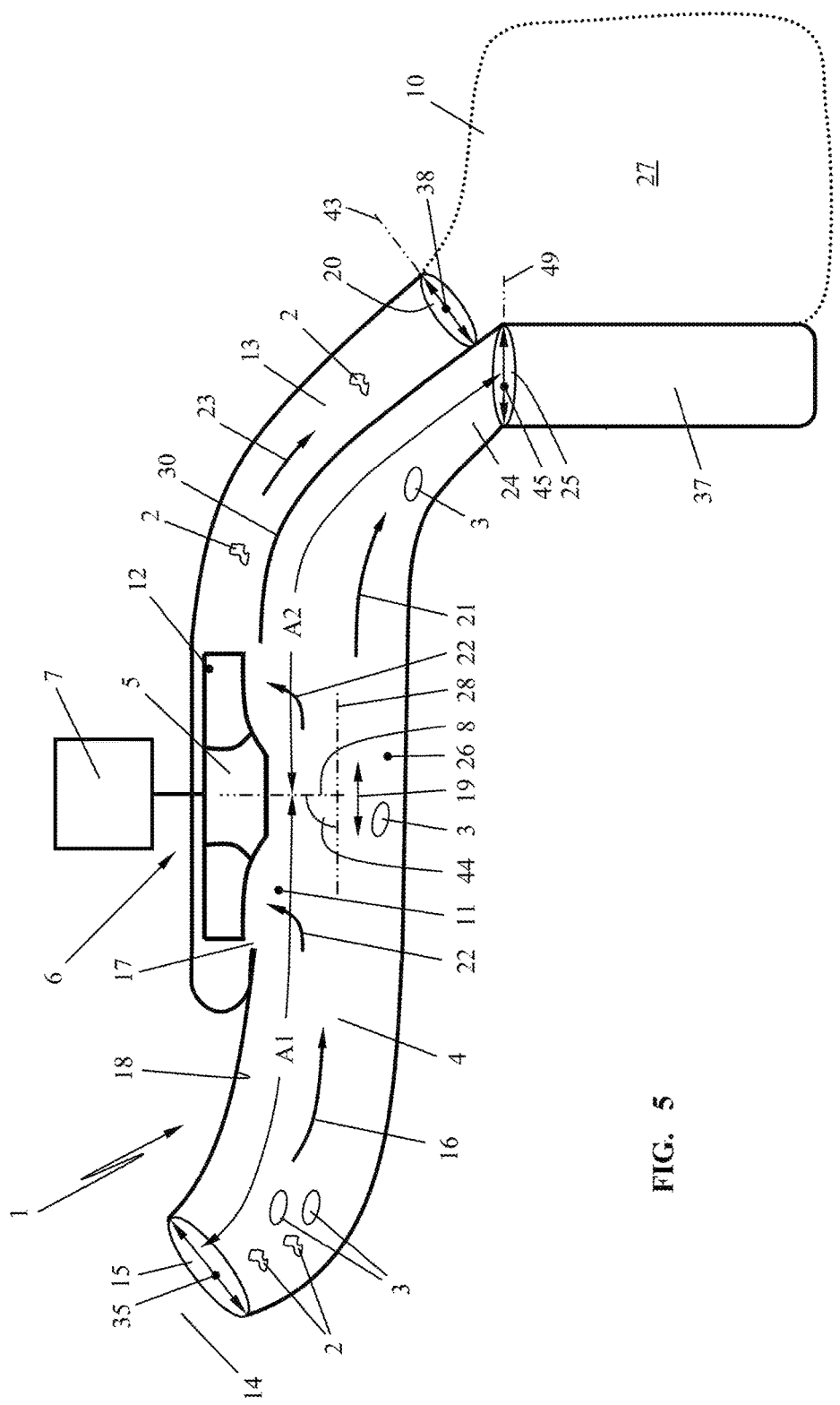
FIG. 5 shows a further embodiment of a vacuum device with a radial blower, an at least partially air-permeable collecting container for collecting hard collected material, and a collecting bag at the blow-out opening of the discharge air flow.

The embodiment according to FIG. 5 corresponds to the embodiment according to FIG. 1 so that for same parts same reference characters are employed.

In the embodiment according to FIG. 5, the discharge opening, i.e., the outlet opening 25 of the intake pipe 4, opens into a collecting container 37 which is designed as a separate and e.g. rigid collecting container 37. The separate collecting container 37 may have air outlet openings. It may be expedient to provide the collecting container 37 without air outlet openings.

The blow-out opening 20 of the pressure channel 13 opens into a collecting chamber 27 which is formed of a collecting bag 10 that is in particular air-permeable. As shown in the embodiment of FIG. 5, the plane 49 of the discharge opening is positioned at an angle relative to the plane 43 of the blow-out opening 20.

Figure 6:
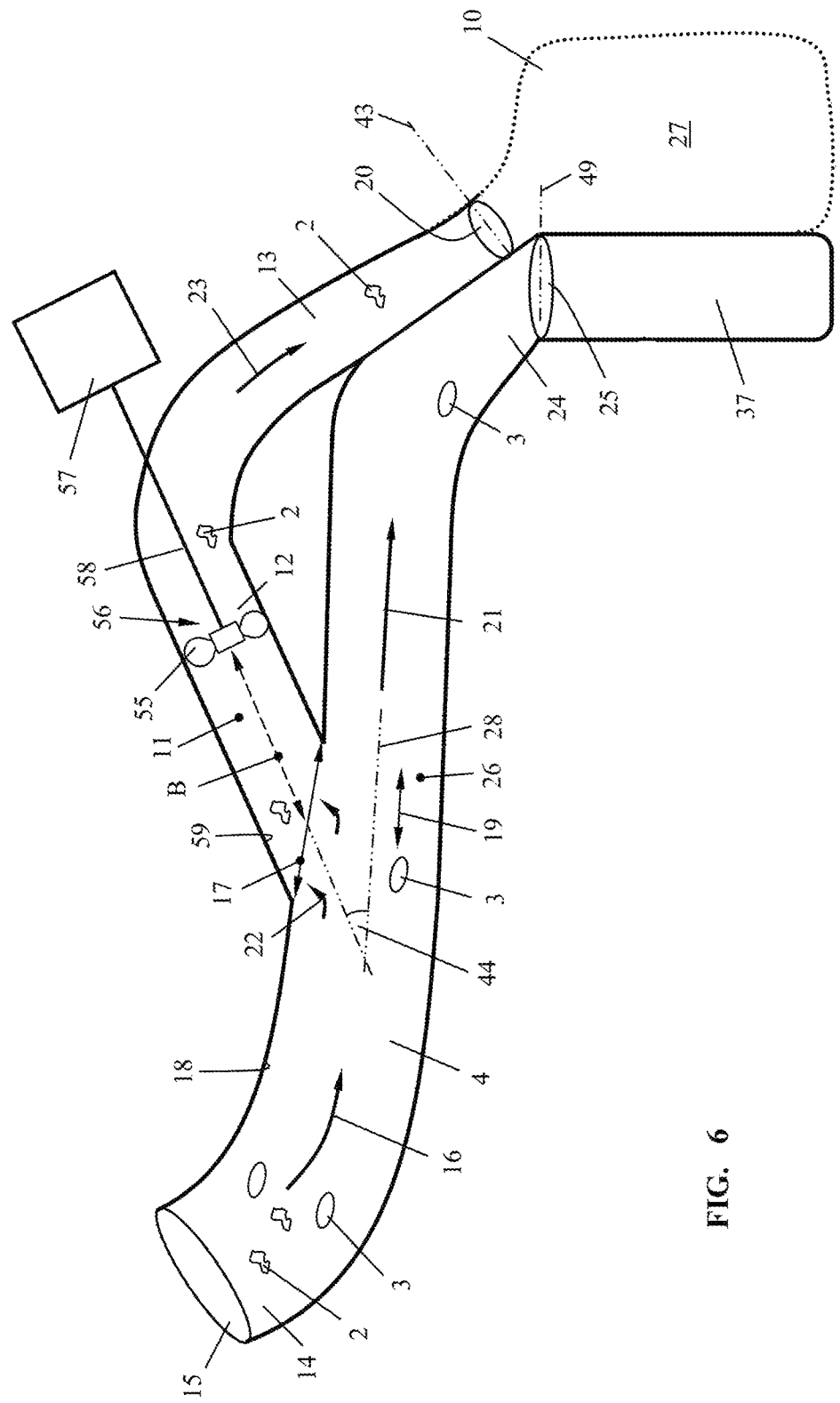
FIG. 6 shows a configuration of the vacuum device according to FIG. 5 with an axial blower.

The embodiment according to FIG. 6 corresponds in its basic configuration to that of FIG. 5 so that for same parts same reference characters are employed. In the embodiment according to FIG. 6, an axial blower 56 is provided instead of the radial blower 6; the channel course corresponds to that of FIG. 2.

The vacuum device according to FIG. 6 has, in accordance with FIG. 5, a separate collecting container 37 which serves for receiving the heavy collected material 3. The lighter collected material 2 is conveyed through the axial blower 56 and is blown out via the pressure channel 13 and the blow-out opening 20 into the collecting space 27 which is formed by a collecting bag 10 that is preferably air-permeable.

In all embodiments, the heavy collected material 3 is immediately guided, i.e., without passing through the blower 6, by means of the discharge opening into a separate or a common collecting space that is at least partially air-permeable.

In addition to the configurations with axial and radial blowers, expediently also mixed forms may be used, for example, so-called diagonal blowers. For diagonal blowers, the afore described configurations for axial and radial blowers according to FIGS. 1 to 6 are advantageous as well. Instead of an axial and radial blower, a diagonal blower can be employed.

The features and advantages that have been described in connection with FIGS. 1 and 2 apply also to FIGS. 3 to 10.

In FIGS. 7 to 10, in the area of the discharge opening a locking flap 60 is arranged. The locking flap 60 can be located at the level, i.e., in the cross-sectional plane, of the discharge opening or displaced relative to the discharge opening. The locking flap 60 represents a no-return flap that enables flow in one direction and prevents flow in the opposite direction. The locking flap 60 closes off the discharge opening in closed position 64 when air flows from the direction of the collecting bag 10 in the direction to the blower inlet opening 17. This is the case e.g. when the intake opening 15 is clogged and the blower, by means of the second end 24 of the intake pipe 4, sucks in air from an air-permeable collecting space 27. The locking flap 60 can be moved from its closed position 64 only opposite to the direction of arrow 61 in the direction toward the collecting bag 10. Further pivoting of the closed locking flap 60 in the direction of the blower inlet opening 17 is not possible. "Breaking through" of the locking flap 60 can be prevented by a stop 70. A stop 70 is not only to be understood as an additional component but also as a suitable contour of the end 24 of the intake pipe 4 which prevents further pivoting of the locking flap 60 relative to the intake pipe 4 in the direction of arrow 61 when the locking flap 60 is in the closed position.

It can be advantageous to keep the locking flap 60 closed, in particular locked, in its closed position 64. This can be advantageous, for example, for collecting in a targeted fashion nuts or similar fruits and to prevent them from exiting into the common collecting space 27 that is being filled e.g. with leaves and dirt. Accordingly, the locking flap 60 not only is a no-return flap that blocks one flow direction but advantageously is also a temporary closure of the discharge opening that also impairs or in particular blocks the other flow direction, i.e., the flow direction from the intake pipe into the collecting space 27.

Figure 7:
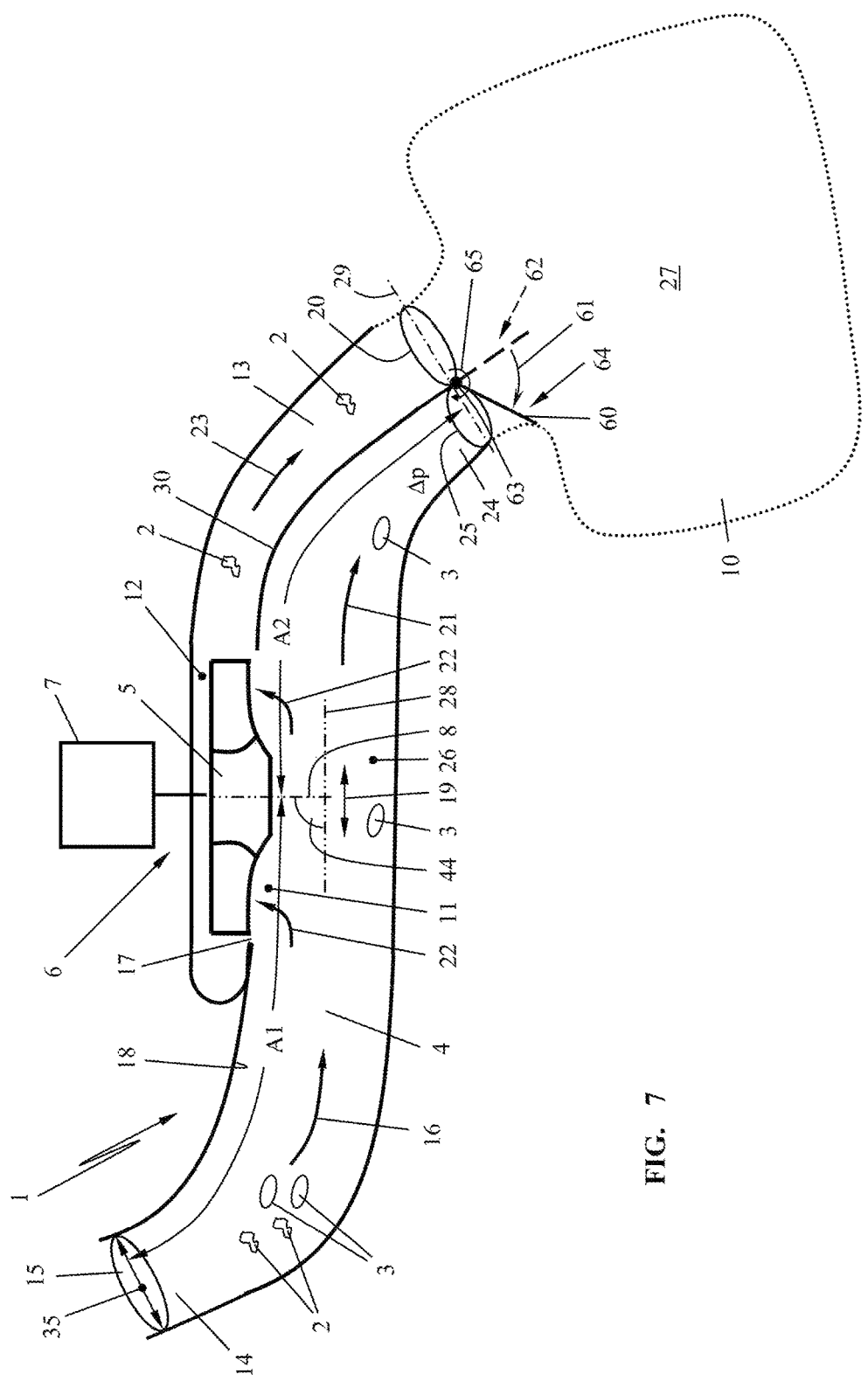
FIG. 7 shows a vacuum device according to the invention with a radial blower according to FIG. 1 with a locking flap arranged at the discharge opening for hard collected material.

In FIG. 7, at the level of the collecting space 27 in front of the discharge opening a locking flap 60 is arranged which, in a closed position 64, closes off the outlet opening 25 at the end 24 of the intake pipe 4. Accordingly, the discharge opening is closed, preferably air-tightly closed. In this way, a fluidic bypassing between the pressure channel 13 and the blower inlet opening 17 in the intake pipe 4 is prevented.

In a first embodiment, the flap 60 is supported so as to swing freely so that, when a flow from the collecting space 27 in the direction of the outlet opening 25 occurs, the locking flap 60 is entrained in the direction of arrow 61 and is moved from the open position 62 into the closed position 64. The locking flap 16 is always positioned in the closed position 64 when in the area of the end 24 in the intake pipe 4 a vacuum Δp exits which could lead to an air flow opposite to the direction of arrow 21 in the intake pipe 4. When a vacuum Δp is existing in the area of the end 24 of the intake pipe 4, the locking flap 60 closes and assumes the closed position 64 in accordance with FIG. 7.

When the locking flap 60 is closed, the heavy collected material 3 will back up in front of the locking flap 60 and, due to the force of gravity, effect an increasing opening force acting on the locking flap 60 opposite to the direction of arrow 61. When due to the backed-up heavy collected material 3 the opening force is greater than the closing force that is generated by the vacuum Δp, the locking flap 60 will open opposite to the direction of arrow 61 and, at least for a short period of time, will move into the open position 62 illustrated in dashed lines. The heavy collected material 3 drops into the collecting space 27; the locking flap 60 is relieved from the heavy collected material 3 and, under the action of the vacuum Δp and a spring force 65 of a return spring that may be provided if needed, can pivot in the direction of arrow 61 out of the open position 62, illustrated in dashed lines, into the closed position 64. It can also be advantageous to arrange and design the locking flap 60 such that the momentum of heavy collected material 3 impacting on the locking flap 60 will open briefly the locking flap 60 so that the heavy collected material 3 can pass the locking flap 60 and reach the collecting space 27.

In the embodiment illustrated in FIG. 7, the support (bearing) 63 of the locking flap 60 is arranged between the outlet opening 25 for heavy collected material 3 and the blow-out opening 20 of the pressure channel 13. In this way, the locking flap 60 is positioned in the open position 62 between the blow-out opening 20 and the outlet opening 25. In the open position 62 illustrated in dashed lines, the locking flap 60 is thus arranged in the flow area of a possible bypass flow between pressure channel 13 and intake pipe 4. The position of the locking flap 60 in open position 62 between the outlet opening 25 and blow-out opening 20 ensures that the locking flap 60 is entrained, in case a bypass flow is building up, in the direction of arrow 61 and is held in the closed position 64, advantageously solely by the action of the vacuum Δp.

It can be advantageous to arrange in the bearing 63 of the locking flap 60 a spring whose spring force 65 moves the locking flap 60 into its closed position 64. Under the action of the spring force 65, the resting position of the locking flap 60 is its closed position 64. Opening of the spring-loaded locking flap 60 can occur, for example, when the backed-up heavy collected material 3 exerts a weight force onto the locking flap 60 which surpasses the spring force 65 and/or the momentum of the heavy collected material 3 on the locking flap 60 exerts a momentum required for opening the locking flap 60. When the weight force of the backed-up heavy collected material 3 and/or the momentum of the heavy collected material 3 surpasses the spring force 65 and an overpressure that is possibly existing in the collecting space 27, the locking flap 60 pivots opposite to the direction of arrow 61 into the open position 62 (illustrated in dashed lines) and swings back into the closed position 64 once the heavy collected material 3 has exited into the collecting space 27.

When closing, the open locking flap 16 carries out a pivot movement in the direction of arrow 61 in the direction toward the blower inlet opening 17. A stop 70 prevents the locking flap 60 from moving past the closed position 64 during the course of its pivot movement and prevents the locking flap 60 from aligning with a bypass flow oriented opposite to the direction of arrow 21. These explanations in regard to the movement of the locking flap 16 in FIG. 7 apply likewise to the locking flaps 60 shown in FIGS. 8 to 10.

Figure 8:
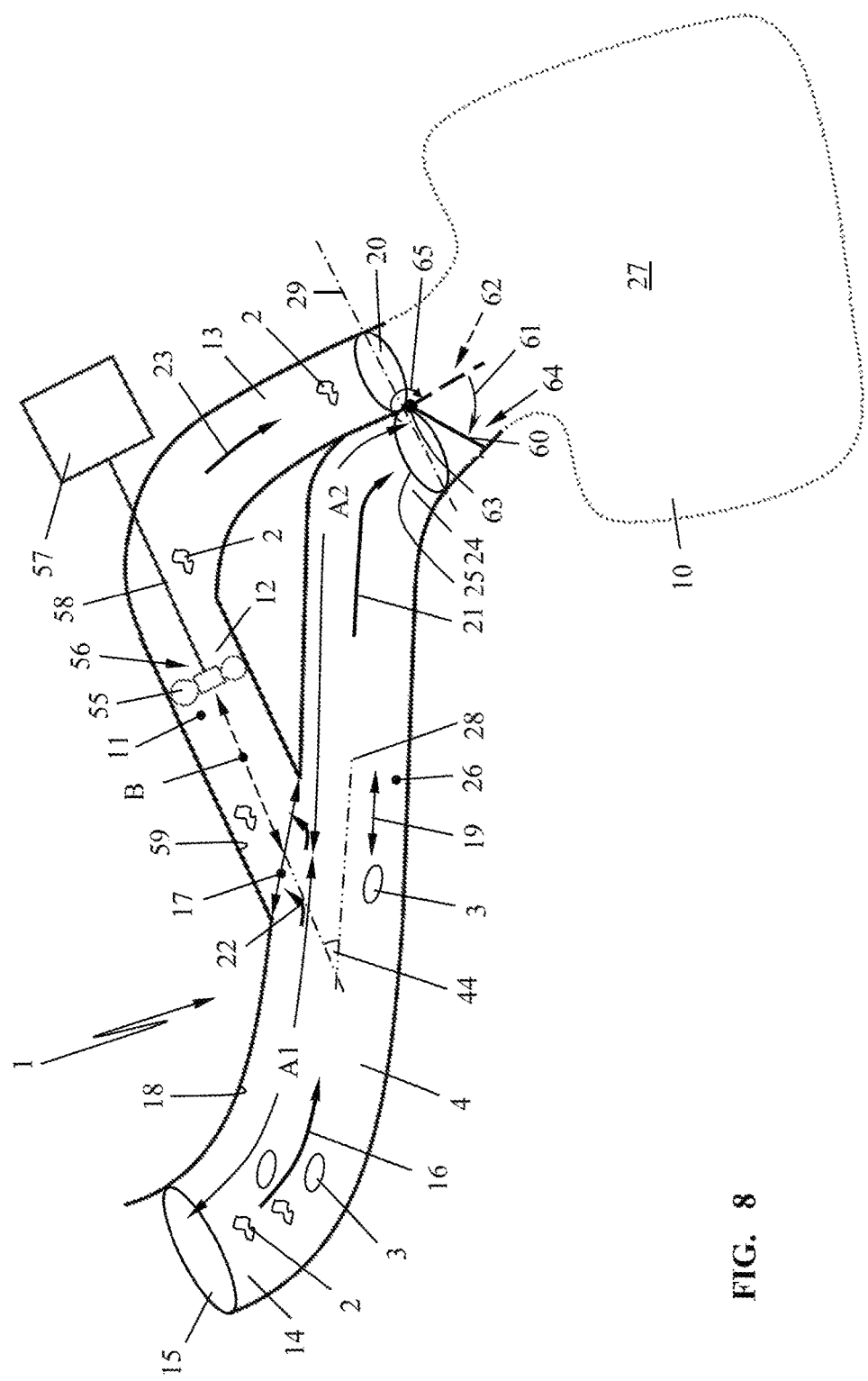
FIG. 8 shows an embodiment of a vacuum device with an axial blower in accordance with FIG. 2 with a locking flap arranged at the discharge opening for hard collected material.

In FIG. 7, the vacuum device according to the invention is illustrated with a radial blower 5. In FIG. 8, an embodiment of a vacuum device is illustrated comprising an axial blower 56 and a locking flap 60 at the level of the discharge opening of the intake pipe 4. The vacuum device according to FIG. 8 corresponds in its configuration to that of FIG. 2; therefore, same parts are provided with same reference characters. The features and advantages which are indicated in connection with the embodiment according to FIG. 2 apply likewise to the vacuum device according to FIG. 8.

Figure 9:
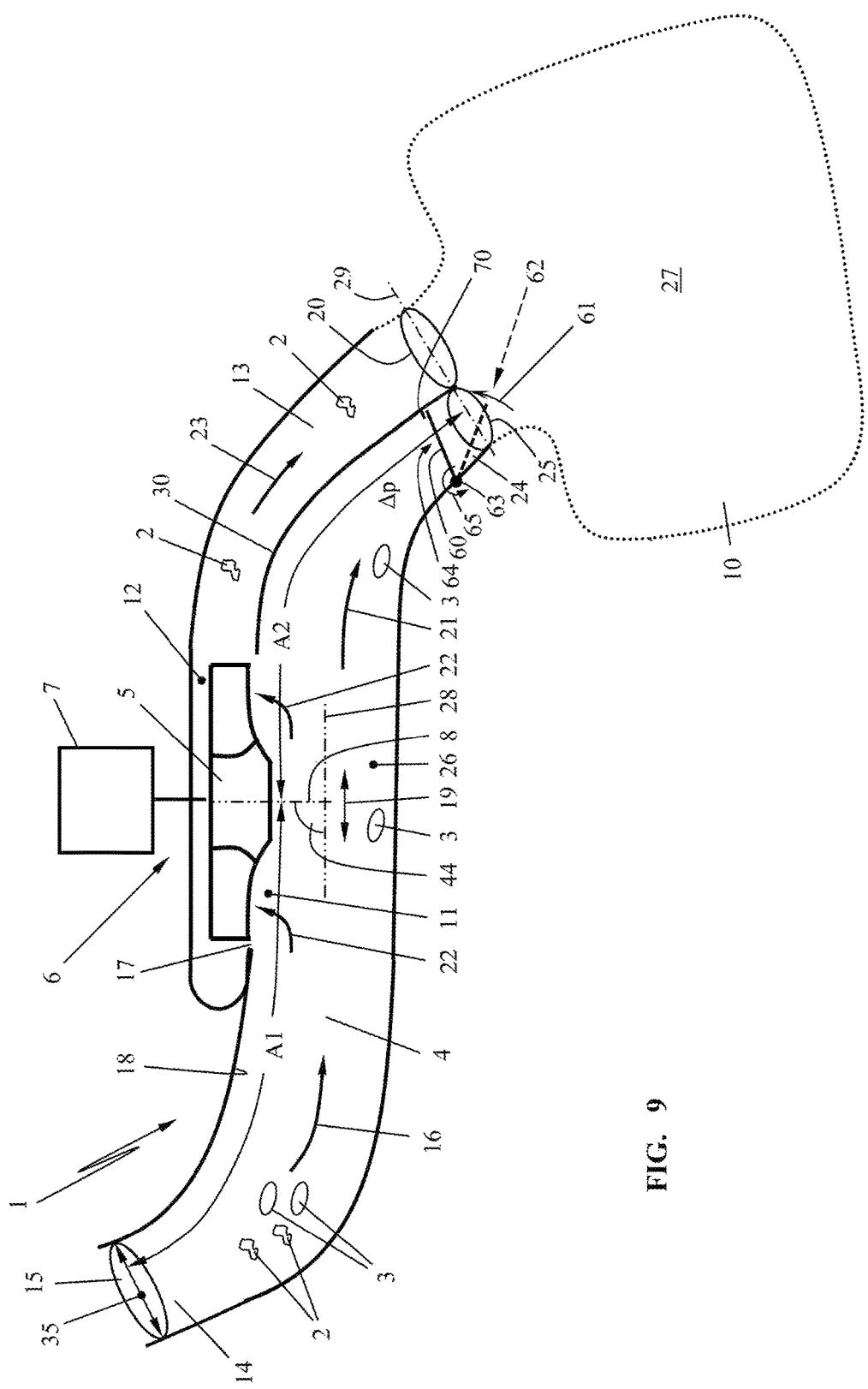
FIG. 9 shows a vacuum device according to the invention with a radial blower in accordance with FIG. 1, comprising a locking flap displaced relative to the discharge opening for hard collected material.
Figure 10:
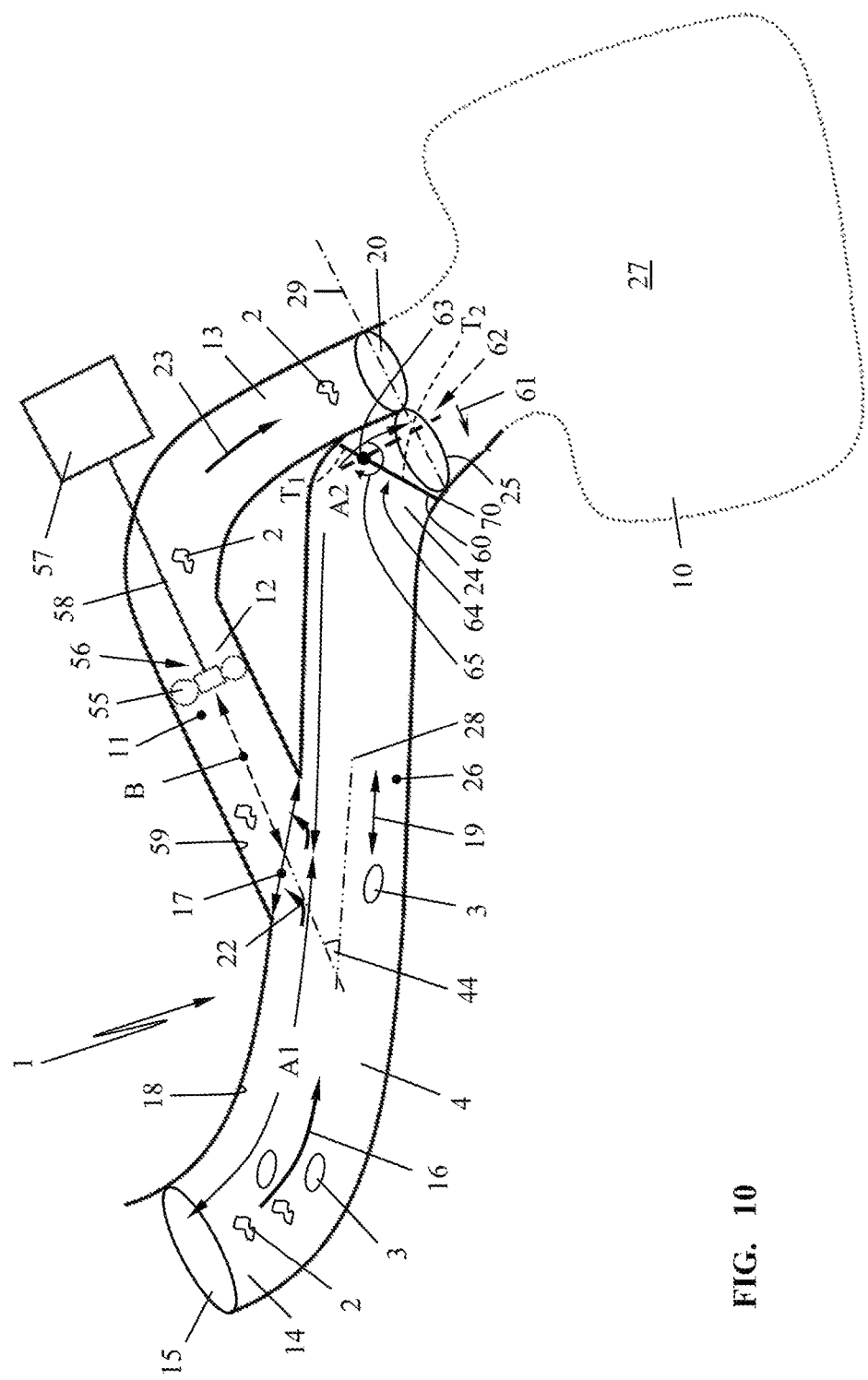
FIG. 10 shows an embodiment of a vacuum device comprising an axial blower in accordance with FIG. 2, comprising a locking flap that is displaced in flow direction relative to the discharge opening for hard collected material.

In FIGS. 7 and 8, the locking flap 60 is closer to the exit opening 25 of the intake pipe 4 than in the embodiments of FIGS. 9 and 10 and closes off the outlet opening 25 in the illustrated closed position 64. The closed position 64 is preferably fluid-tight. It can be expedient to arrange the locking flap 60 displaced to the opening cross-section of the discharge opening, in particular displaced in the direction toward the blower inlet opening 17.

The support (bearing) 63 for the locking flap 60 is provided such that the pivot axis of the locking flap 60 is advantageously positioned at its rim, in particular at a rim section which is facing the pressure channel 13. The support (bearing) 63 of the locking flap 60, as described in connection with FIG. 7, is advantageously provided between the blow-out opening 20 of the pressure channel 13 and the outlet opening 25 of the intake pipe 4.

In a further embodiment, the locking flap 60 can also be formed as a flap that freely swings about the bearing 63 and, when a bypass flow from the pressure channel 13 to the intake pipe 4 is generated, is entrained by the bypass flow and closes, as explained in detail in connection with the embodiment of FIG. 7.

Preferably, the locking flap 60 is loaded by a spring force 65 into the closed position 64 so that, independent of the operation of the vacuum device 1, the locking flap 60 is moved from an opening position 62 in the direction of arrow 61 into the closed position 64. Opening of the spring-loaded locking flap 60 is occurring when the weight force of the backed-up heavy collected material 3 acting on the locking flap 60 has become so great that the locking flap 60 will open and, at least for a short period of time, is displaced into the open position 62. The heavy collected material 3 can exit into the collecting space 27. The locking flap 60 swings back under the action of the spring force 65 in the direction of arrow 61 from the open position 62 into the closed position 64. In this embodiment, the locking flap 60 can also be arranged and designed such that the momentum of heavy collected material 3 impacting on the locking flap 60 will open for a brief period of time the locking flap 60 so that the heavy collected material 3 can pass the locking flap 60 and can reach the collecting space 27.

In FIGS. 9 and 10, further embodiments are illustrated which differ from the afore described embodiments by the support of the locking flap 60. The locking flap 60 can pivot between an open position 62 and a closed position 64 in the bearing 63 about a pivot axis.

In FIG. 9, the bearing 63 is positioned in an outer wall of the intake pipe 4 or of the end 24 of the intake pipe 4. The rim section of the locking flap 60 which is opposite the bearing 63 is resting at a stop 70 in the closed position 64. The stop 70 can be provided on the intermediate wall between the intake pipe 4 and the pressure channel 13. The arrangement is such that the locking flap 60 is positioned father inwardly in the interior of the intake pipe 4 than in the other embodiments.

In the embodiment according to FIG. 10, the pivot axis of the bearing 63 extends perpendicular to the drawing plane transverse through the end 24 of the intake pipe 4. The pivot axis advantageously divides the surface of the locking flap 60 at the incoming flow side into two partial areas $T_1$, $T_2$. Expediently, these two partial areas $T_1$, $T_2$ are different in regard to their size. The locking flap 60 can be spring-loaded. The orientation and the ratio of the partial surfaces $T_1$, $T_2$ are matched to each other such that the locking flap 60 at a defined vacuum $\Delta p$, which is present in the intake pipe 4 and which is reached e.g. when the intake opening 15 is clogged, will assume its closed position 64. Advantageously, the pivot axis is positioned off-center relative to a cross-section of the intake pipe 4 and closer to the wall of the intake pipe 4 which is facing the pressure channel 13. Advantageously, on the pipe wall of the intake pipe 4 a stop 70 for the locking flap 60 is provided wherein the stop 70 is formed by the contour of the intake pipe 4 itself.

Figure 11:
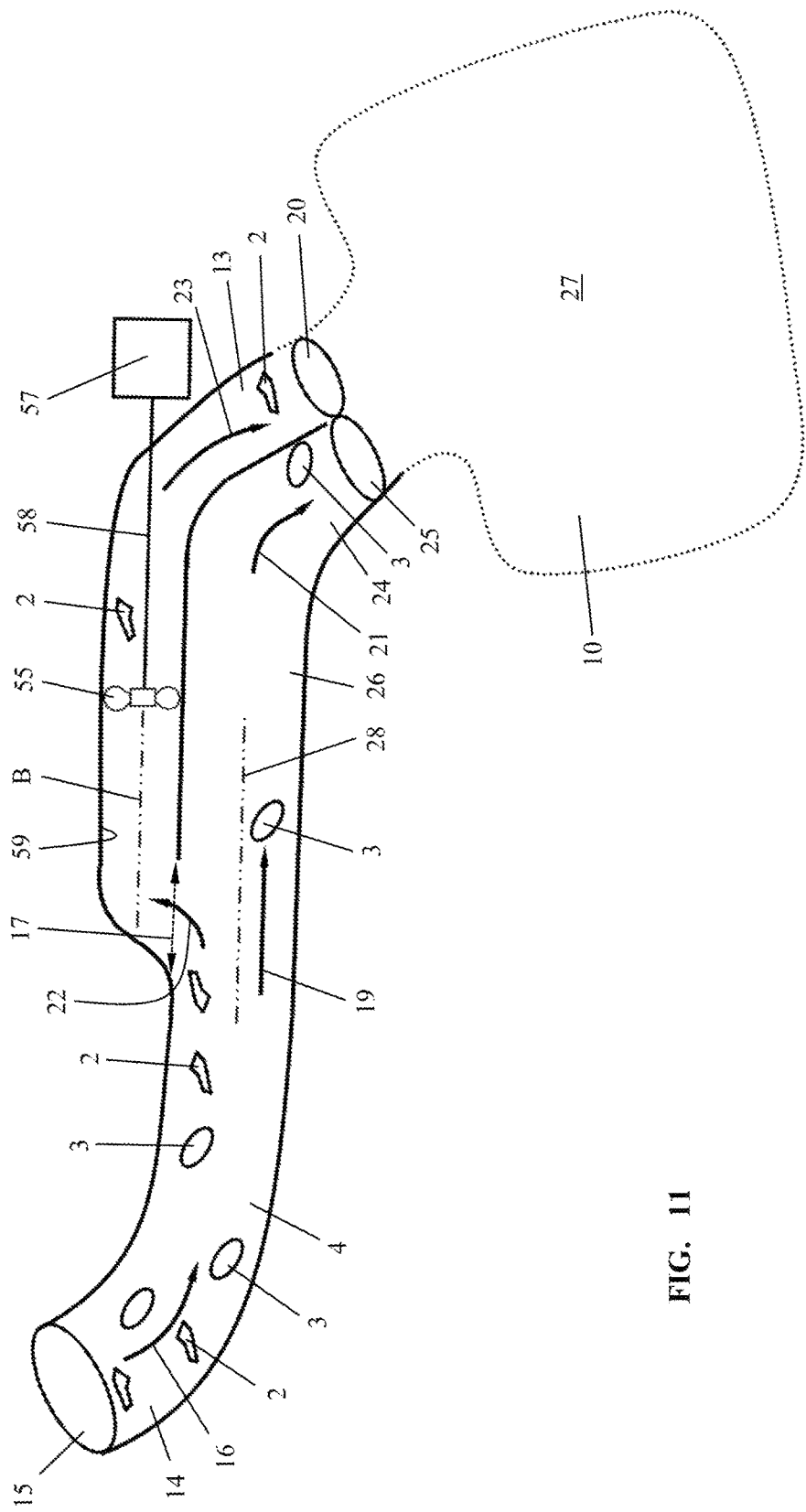
FIG. 11 shows an embodiment where the blower wheel rotates about an axis of rotation extending parallel to a longitudinal center axis of the straight pipe section.

FIG. 11 shows an embodiment where the blower wheel 55 driven by drive 57 rotates about an axis of rotation 58 extending parallel to a longitudinal center axis 28 of the straight pipe section 26. Same reference numerals indicate same parts as in the preceding embodiments.

Within the context of the invention, the constructive details, features, and advantages disclosed in connection with individual embodiments can be exchanged with each other and/or combined with each other independent of the utilized blower type or the configuration of the collecting bag 10. This applies in particular in regard to the arrangement, bearing action, and configuration of the locking flap 60.

The specification incorporates by reference the entire disclosure of German priority document 10 2015 004 664.0 having a filing date of Apr. 13, 2015.

While specific embodiments of the invention have been shown and described in detail to illustrate the inventive principles, it will be understood that the invention may be embodied otherwise without departing from such principles.

What is claimed is:

1. A vacuum device comprising:
a motor;
a blower wheel operatively connected to the motor to be driven by the motor;
the blower wheel comprising a suction side and further comprising a pressure side;
an intake pipe arranged at the suction side of the blower wheel, the intake pipe comprising an intake opening at a first end of the intake pipe and an outlet opening at a second opposite end of the intake pipe, wherein the intake pipe conveys a suction air flow for picking up and entraining a first collected material and a second collected material;
the intake pipe comprising a discharge opening configured to discharge the first collected material from the intake pipe, wherein the outlet opening at the second end of the intake pipe is formed by the discharge opening;
the intake pipe comprising a blower inlet opening formed in a wall of the intake pipe for supplying air to the blower wheel;
a pressure channel comprising a blow-out opening, the pressure channel formed at the pressure side of the blower wheel;
wherein the blower inlet opening, the blower wheel, and the pressure channel are configured such that the second collected material passes through the blower inlet opening and the blower wheel into the pressure channel and is discharged through the blow-out opening by a discharge airflow conveyed in the pressure channel;
the blower inlet opening, viewed in a longitudinal direction of the intake pipe, is positioned between the discharge opening and the intake opening such that the blower inlet opening, viewed in the longitudinal direction of the intake pipe, is positioned at a first spacing relative to the intake opening and at a second spacing relative to the discharge opening.

2. The vacuum device according to claim 1, wherein the first spacing, measured in the longitudinal direction of the intake pipe relative to the intake opening, is greater than the second spacing, measured in the longitudinal direction of the intake pipe relative to the discharge opening.

3. The vacuum device according to claim 1, wherein the intake pipe comprises a straight pipe section and wherein the blower inlet opening is arranged in the straight pipe section of the intake pipe.

4. The vacuum device according to claim 3, wherein the blower wheel rotates about an axis of rotation and wherein the axis of rotation is positioned transverse to a longitudinal center axis of the straight pipe section.

5. The vacuum device according to claim 3, wherein the blower wheel rotates about an axis of rotation and wherein the axis of rotation extends parallel to a longitudinal center axis of the straight pipe section.

6. The vacuum device according to claim 1, wherein the blower wheel is arranged in the wall of the intake pipe in the blower inlet opening.

7. The vacuum device according to claim 1, wherein the blower wheel is positioned at an axial spacing to the blower inlet opening.

8. The vacuum device according to claim 1, wherein the discharge opening and the blow-out opening open into a common collecting space.

9. The vacuum device according to claim 8, wherein a back pressure existing in the pressure channel is decoupled from the suction pressure in the intake pipe.

10. The vacuum device according to claim 1, further comprising a locking flap correlated with the discharge opening, wherein the discharge opening is closable by the locking flap.

11. The vacuum device according to claim 10, wherein the locking flap is pivotable from an open position into a closed position by a vacuum generated in operation of the vacuum device.

12. The vacuum device according to claim 10, wherein the locking flap is loaded by a spring force into a closed position.

13. The vacuum device according to claim 1, wherein a size of a flow cross-section of the intake opening of the intake pipe is greater than a size of a flow cross-section of the discharge opening of the intake pipe.

14. The vacuum device according to claim 13, wherein the blow-out opening of the pressure channel is designed such that a suction air flow from the intake pipe into a collecting space arranged downstream of the discharge opening is enhanced.

15. The vacuum device according to claim 1, wherein the intake pipe and the pressure channel are formed as flow passages that are constructively separated from each other.

* * * * *